Sept. 6, 1938.  J. W. GREIG  2,129,004
RADIO SIGNALING
Filed May 8, 1937  6 Sheets-Sheet 1

Sept. 6, 1938.  J. W. GREIG  2,129,004
RADIO SIGNALING
Filed May 8, 1937  6 Sheets-Sheet 3

INVENTOR
JOHN W. GREIG DECEASED
BY ETHEL MARGARET GREIG
HIS EXECUTRIX
BY A. J. Zerbarini
ATTORNEY

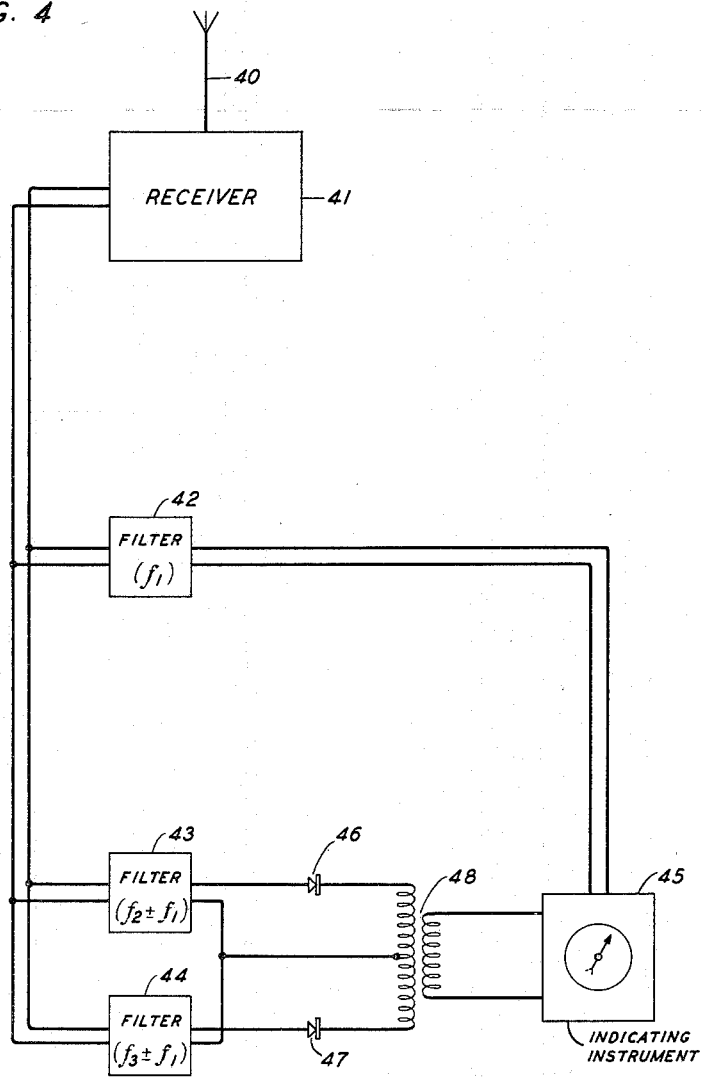

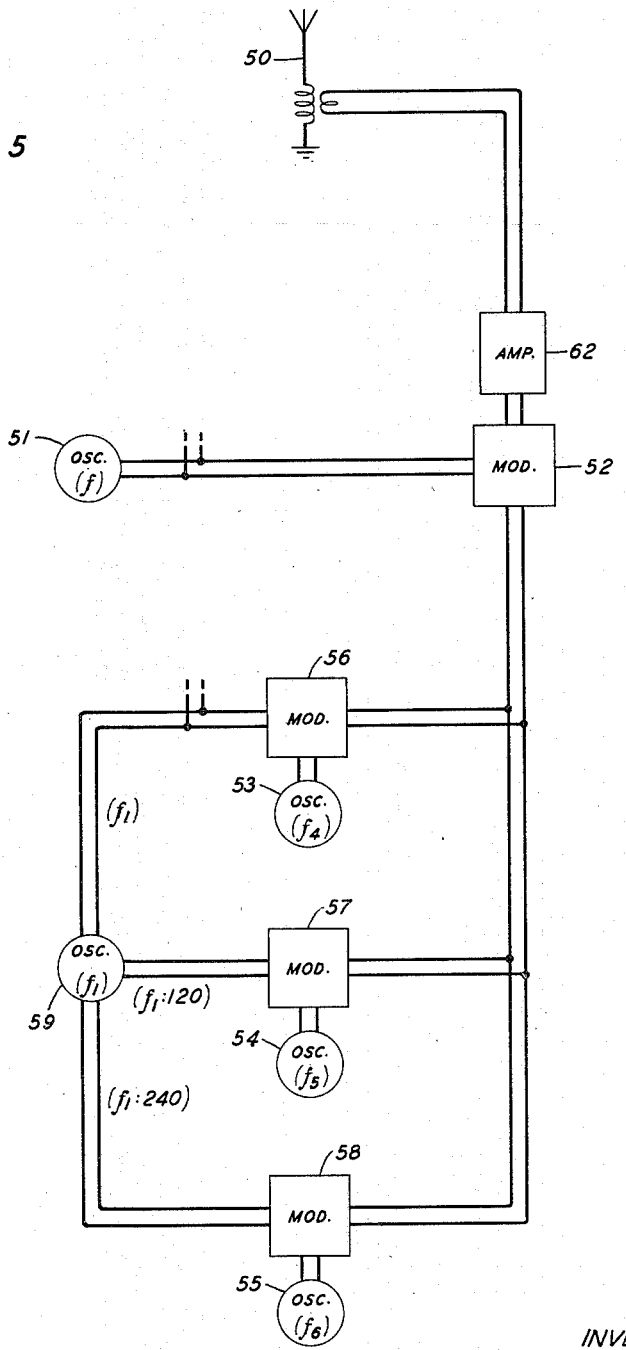

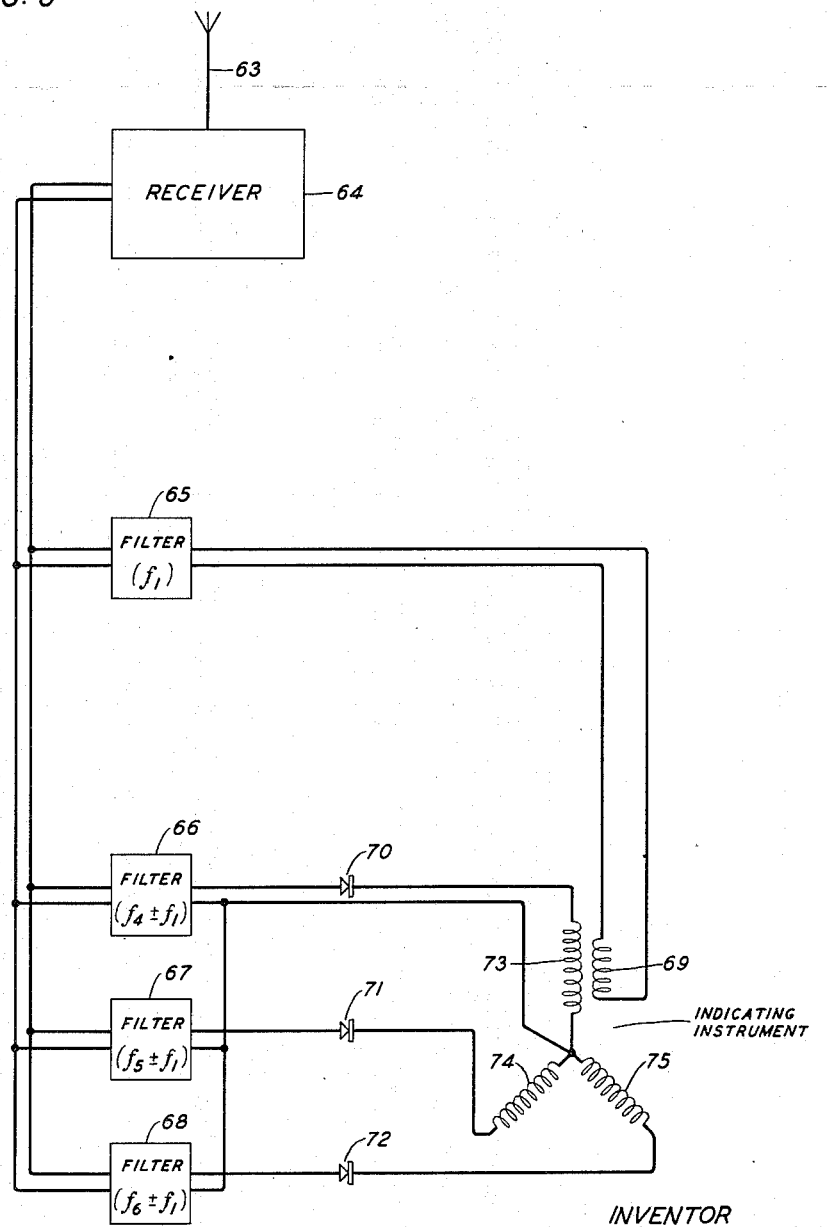

Patented Sept. 6, 1938

2,129,004

UNITED STATES PATENT OFFICE 2,129,004

RADIO SIGNALING

John W. Greig, deceased, late of Dayton, Ohio, by Ethel Margaret Greig, executrix, Seattle, Wash., assignor to Bell Telephone Laboratories, Incorporated, New York, N. Y., a corporation of New York Application May 8, 1937, Serial No. 141,573

4 Claims. (Cl. 250—11)

This invention relates to radio signaling and particularly to direction finding systems for mobile objects, such as aircraft.

The objects of the invention are to simplify the equipment both at the sending and receiving stations in a system of direction finding which utilizes the phase relation of the radiated waves for determining the direction; to reduce the number of signaling sources needed at the sending station for radiating the signaling waves whose phases are compared at the receiving station; and otherwise to improve systems and methods relating in general to radio beacon signaling and direction finding.

It has been proposed heretofore to lay down a radio beacon course for the guidance of aircraft by means of a transmitting beacon which transmits directional radio waves of one frequency to establish in space the effect of a constantly rotating field, and which also transmits a non-directional wave of a second frequency bearing a known phase relationship to the directional waves. Since the direction and non-directional waves are of different frequencies, it is necesary to convert them at the receiving station into waves of a common frequency in order that their phases may be compared easily by means of an instrument, such as a synchroscope, to determine the position of the receiving station with respect to the beacon course. It is also old to receive two waves of different frequency, each sent from a separate antenna at the transmitting beacon and to compare their phases with standard sources of the same frequencies at the receiving station which are known to be in phase synchronism with the corresponding waves when transmitted from the antennae at the beacon.

According to a feature of the present invention certain advantages are gained over these prior arrangements by utilizing signal waves of a single frequency for modulating the carrier waves to establish in space both a directional and a non-directional field. The directional field is established by radiating with a suitable antenna array a high-frequency carrier modulated with said signal wave, and the non-directional field is obtained by first modulating a low-frequency carrier with a wave of said signal frequency and using the resultant wave to modulate a wave of said high-frequency carrier and then radiating the product of this double modulation. The receiver on the moving craft is arranged to receive and demodulate both of these high-frequency modulated carrier waves, obtaining as a product thereof the signal frequency of the directional field and the low-frequency carrier modulated with the signal frequency of the non-directional field. Since it is the phase relation of these two signal components which determines the position of the craft, it is desirable to apply them simultaneously to the separate windings of a phase comparing device, such as a synchroscope. To do this the receiving set is equipped with filters which selectively separate, after demodulation, said signal frequency representing the directional field and the low-frequency modulated carrier representing the non-directional field. Thereupon the low-frequency carrier is demodulated to obtain the signal frequency wave, and both of said signal waves are then applied to a synchroscope. If the beacon course is taken as that line radiating from the beacon along which the low-frequency signal waves of both the directional and non-directional fields are in phase, the indicating synchroscope will show no deflection so long as the craft follows this course.

Another feature is an arrangement for establishing the non-directional field by using two low-frequency carriers to modulate the high-frequency carrier. Both of these low-frequency carriers are first modulated with said signal frequency waves, the modulating wave for one being in phase opposition to that for the other. The effective result of this double modulation is to produce an envelope having a frequency double that of the signal frequency. The advantage of this is that while the receiver is demodulating, in its first stage, the directional carrier to obtain the signal frequency and the non-directional carrier to obtain the two modulated low-frequency carriers, should any undesirable demodulation of these low-frequency carriers also occur at this stage, the product would be a current of double the signal frequency itself. This double frequency will not pass the selective filters in the circuits between the first demodulation stage and the phase comparing instrument; therefore, any such undesirable demodulation does not interfere with the proper operation of the system. Following the first stage of demodulation the low-frequency carriers are separated from the directional signal frequency and from each other by filters. They are then demodulated to produce the signal frequency, and the signal frequency waves resulting from both stages of demodulation are then compared for phase.

Another feature is to utilize three low-frequency carriers with the modulating signal waves spaced 120 degrees apart. In this case the components of signal frequency resulting from any undesirable demodulation neutralize each other.

Another feature of the invention is an improved method of signaling and direction finding utilizing the phase relation principle above described.

Other and further features of the invention will be described more fully in the following detailed specification and will also be set forth in the appended claims.

Referring to the drawings which should be considered in connection with the detailed specification:

Fig. 4 is the receiving equipment cooperating therewith; and Fig. 5 is a still further modification of the transmitting beacon equipment, and Fig. 6 illustrates the receiving station cooperating therewith.

In illustrating the different embodiments of the invention, the several parts of the equipment have to a large extent been shown in a conventional manner. Furthermore, all equipment not necessary to an understanding of the invention has been omitted. It will be understood, however, that the different circuit and equipment units which have been shown diagrammatically may be of any of the well-known types and that all elements which have been omitted merely for the sake of clarity may be added to the system.

Figure 1:
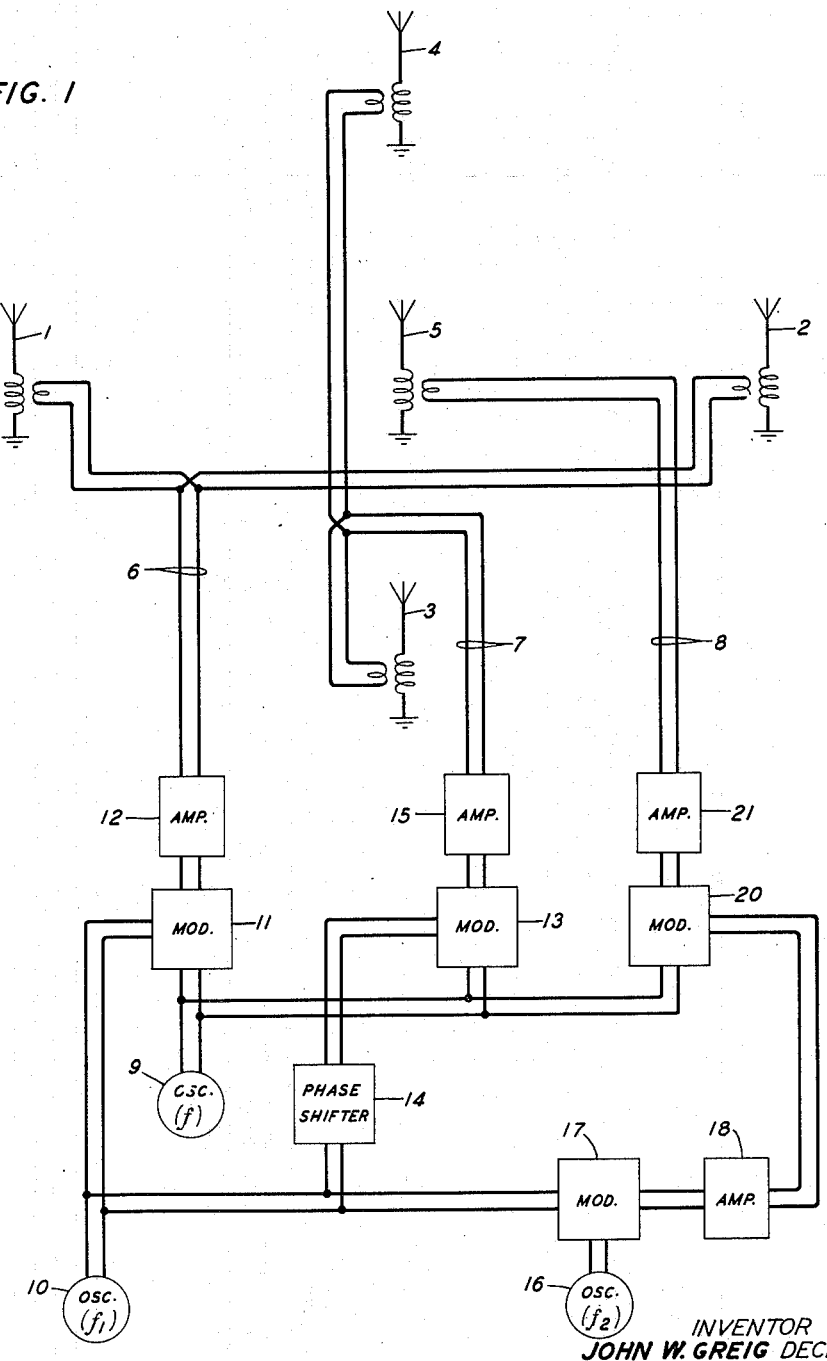
Fig. 1 illustrates diagrammatically the antenna array and the transmitting equipment at a sending beacon station.
Figure 2:
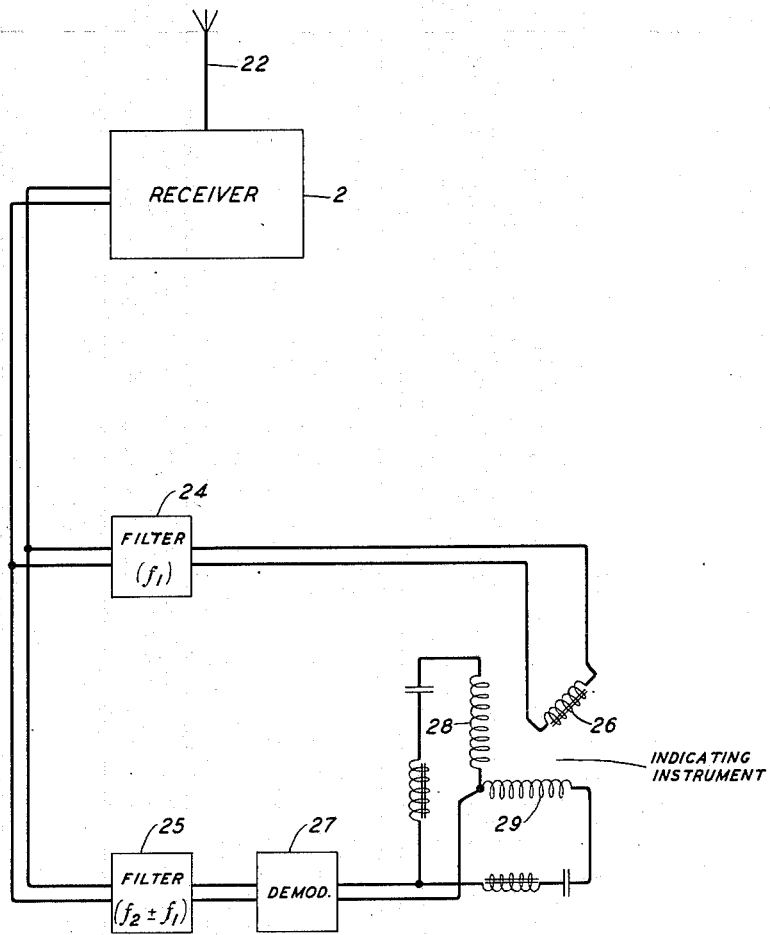
Fig. 2 is a diagrammatic illustration of the receiving equipment on the aircraft or other mobile object.

The signaling system shown in Figs. 1 and 2 comprises a transmitting beacon having an array of four directional antennae 1, 2, 3, 4 and a non-directional antenna 5. The antennae 1 and 2 are coupled to each other and connected to the transmission circuit 6 extending from the sending equipment. The coupling connection between the antennae 1 and 2 is reversed so that the field established in space by the antenna 2 is in phase opposition to the field of antenna 1. As is well known, the resultant of these fields has a directional characteristic, the maximum intensity being along the line which includes the two antennae. In a similar manner the antennae 3 and 4 are joined by a coupling circuit which connects them to the sending equipment by way of transmission circuit 7. The antennae 3 and 4 are arranged preferably at right angles to the antennae 1 and 2 and also establish in space a similar resultant field in respect to antennae 3 and 4 by reason of the reversal in the coupling circuit joining antennae 3 and 4. The fifth or non-directional antenna 5 is preferably located in the center of the figure formed by the four directional antennae. The antenna 5 is coupled to the transmitting equipment by way of the transmission line 8.

The transmitting equipment includes an oscillation generator 9 which supplies a wave of some suitable carrier frequency $f$. The carrier wave produced by the generator 9 is modulated by a signal wave of some suitable frequency $f_1$, such as 60 cycles, and the products of this modulation are applied to the antennae 1 and 2 for radiation. The signal wave is produced by the generator 10.

The generators 9 and 10 are connected to the modulator 11, which serves to modulate the carrier wave $f$ with the signal wave $f_1$. The side-band frequencies resulting from the modulation are amplified by an amplifier 12 and applied by way of the transmission circuit 6 to the radiating antennae 1 and 2. The oscillation generator 9 is also connected to a second modulator 13, and the signal generator 10 is also connected to this modulator by way of a phase-shifting device 14. The device 14 shifts the phase of the wave $f_1$ applied to the modulator 13 through an angle of 90 degrees with respect to the wave $f_1$ applied to the modulator 11. The side-band frequencies produced by the modulator 13 are amplified by amplifier 15 and applied by way of transmission circuit 7 to the radiating antennae 3 and 4. It is desirable that the modulators 11 and 13 are of the type in which the carrier wave $f$ is suppressed and only the side-band frequencies are radiated by the antennae 1 and 2 and 3 and 4. In this case a wave of the carrier frequency $f$ is also radiated as will be explained later for the purpose of demodulation at the receiving station. The effect of impressing these side-band waves upon the antennae 1 and 2 and 3 and 4 with the signal frequency $f_1$ in phase quadrature for the two modulations is to produce in space a field which may be described as rotating around the central point of the antenna array. That is to say, if a circle of any given radius is chosen with its center at the transmitting beacon, the maximum field intensity moves around the circumference of the circle at a frequency equal to that of the signal wave.

In addition to the equipment above described the transmitting station in Fig. 1 also includes an oscillation generator 16 for producing a low frequency carrier wave of some suitable frequency $f_2$. This low-frequency carrier wave $f_2$ is applied together with a wave of the signal frequency $f_1$ to a modulator 17, to produce an output of $(f_2+f_1)$ and $(f_2-f_1)$. The modulated low-frequency carrier wave $f_2$ is then amplified by an amplifier 18 and applied together with a wave $f$ from the high-frequency carrier source 9 to the modulator 20. The modulator 20 modulates the high-frequency carrier wave $f$ with the signal modulated low-frequency carrier wave $f_2$ and delivers the partially modulated carrier wave $f$ [i. e. $f$ and $f \pm (f_2 \pm f_1)$] over the transmission circuit 8 to the central antenna 5. These waves may be amplified if desirable by the amplifier 21 before impressing them upon the antenna 5. The effect of this is to establish in space a non-directional field including high-frequency carrier waves and the side-band frequency waves resulting from the modulation of the high-frequency carrier wave with the signal modulated low-frequency carrier wave. Since the signal wave $f_1$ applied to the modulator 17 is in phase with the signal wave $f_1$ simultaneously applied to the modulator 11, the non-directional field established by antenna 5 is in audio phase with the directional field established by antennae 1 and 2 on one side of the beacon station and in phase opposition to the directional field established by these antennae on the other side of the beacon station. And the non-directional field will be in audio phase quadrature to the directional field established by the other pair of antennae 3 and 4. In other words, if the directional line of the antennae 1 and 2 is taken on one side of the beacon station, the directional and non-directional fields are in phase with each other along this line. At points on either side of this line there exists a difference of phase between the directional and non-directional fields which increases to a maximum of 90 degrees as the directional line of the other two antennae 3 and 4 is approached. Therefore, by arranging the receiving equipment on the moving craft to detect the signal wave involved in the directional field and also the signal wave involved in the non-directional field and by comparing these two signal waves for their phase relation, it is possible for the observer to determine his position with respect to any directional line extending through the beacon station. If the directional line of the antennae 1 and 2 is chosen on one side of the antenna system as a line of flight, the signal waves detected at all points along this line will be in phase synchronism and by applying these waves to some suitable instrument such as a synchroscope, visible indication of the line of flight may be obtained. A suitable receiving station for this purpose is shown diagrammatically in Fig. 2.

The receiver of Fig. 2 comprises an antenna 22 and a receiving set 23. The directional, non-directional and carrier waves are received by the antenna 22 and the receiver 23 demodulates the directional high-frequency modulated carrier wave and obtains therefrom the signal wave $f_1$. At the same time the receiver 23 demodulates the non-directional wave and obtains therefrom low-frequency carrier wave $f_2$ modulated with the signal wave $f_1$. The directional signal wave and the non-directional low-frequency carrier wave modulated with the signal are separated from each other by means of filters 24 and 25. The filter 24 passes the signal wave $f_1$ and delivers it to the winding 26 of a synchroscope. The filter 25 passes the low-frequency modulated carrier wave and the low-frequency carrier wave and delivers them to the demodulator 27. The modulated low frequency carrier is demodulated to obtain the signal wave of the non-directional field. This signal wave is applied to the coils 28 and 29 of the synchroscope after passing through suitable phase shifting circuits. The phase shifting circuits serve to split the phase of the low-frequency signal advancing one phase and retarding the other by equal amounts. Thus by applying the signal waves to the synchroscope a comparison of their phases is obtained to indicate the azimuth or the angular position of the receiving set with respect to a fixed radial line passing through the center of the transmitting antenna system.

Figure 3:
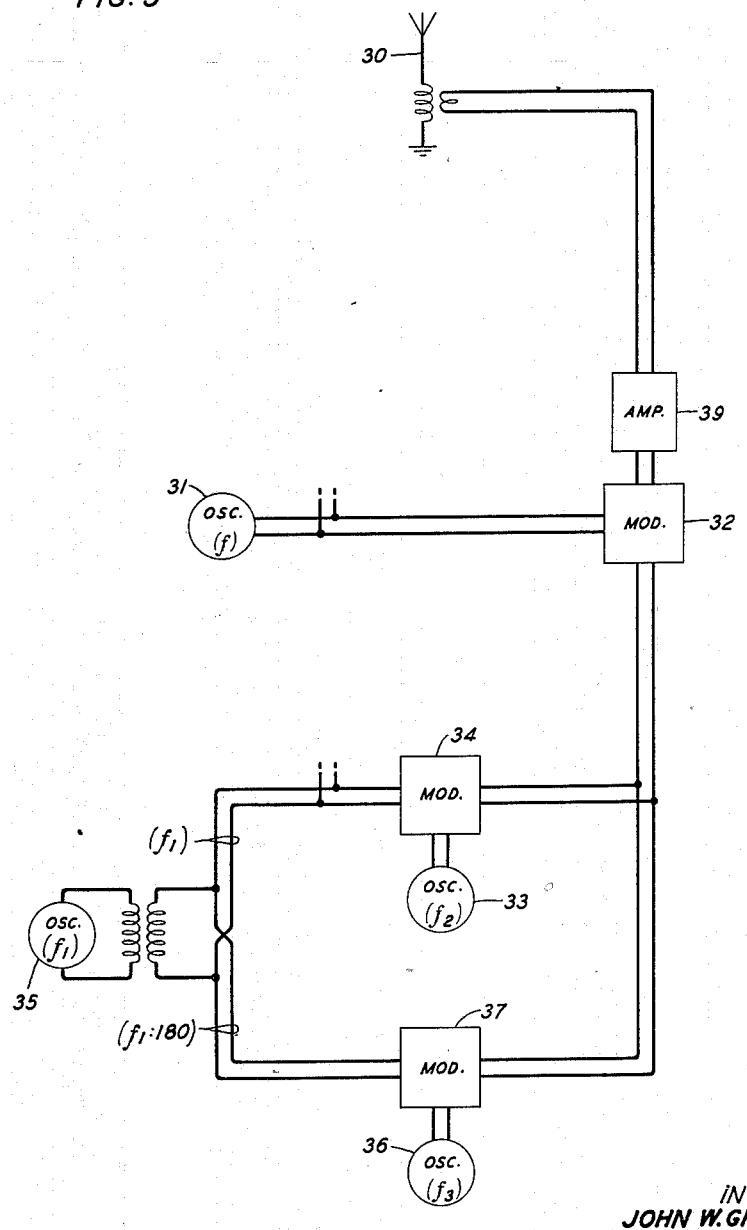
Fig. 3 is a modification of the transmitting beacon equipment.

The alternative system disclosed in Figs. 3 and 4 is designed to obviate the undesirable effect that might result from any unwanted demodulation of the modulated low-frequency carrier wave during the first demodulation process at the receiving station. To this end the transmitting station shown in Fig. 3 in the alternative system is arranged to set up the non-directive field by means of two low-frequency carriers each of which is modulated with the signal wave. These low-frequency carriers $f_2$ and $f_3$ have different frequencies, and the signal wave $f_1$ used to modulate one of these low-frequency carriers is in phase opposition to the signal wave $f_1$ of the same signal frequency used to modulate the other low-frequency carrier $f_3$. When the high-frequency carrier is modulated by these two low-frequency modulated carriers, the envelope of the side-band frequency wave radiated in space will have a frequency double that of the signal wave $f_1$. If, therefore, any unwanted demodulation of the low-frequency carriers takes place at the receiver during the first state of demodulation, the result will be a wave of double the signal frequency rather than a wave of the signal frequency. This double frequency wave does not interfere with the signal frequency wave derived at the same time by the demodulation of the directional field, since the filter which selects the wave of signal frequency excludes the unwanted double frequency wave.

In Fig. 3 only the central antenna 30 is illustrated. The high-frequency carrier source 31 supplies a wave of frequency $f$ to the modulator 32. The low-frequency carrier source 33 generates a carrier wave of some suitable frequency $f_2$, such as 3,000 cycles, and supplies it to the modulator 34. A signal wave $f_1$ is also supplied to the modulator 34 from source 35 for modulating the wave $f_2$. The second low-frequency carrier wave $f_3$ is generated by a source 36 and is supplied to the modulator 37. The frequency of wave $f_3$ may be of any suitable value, such as 3,300 cycles. A second signal wave $f_1$ of the same frequency is obtained from the source 35 but of opposite phase. This signal wave $f_1$ is applied to the modulator 37 for the purpose of modulating the low-frequency carrier wave $f_3$. The modulated low-frequency carrier waves are both applied to the modulator 32 and serve to modulate the high-frequency carrier wave $f$. The output products of the modulator 32 are amplified, if desirable, by an amplifier 39 and applied to the antenna 30 for radiation.

The receiving station in Fig. 4 includes antenna 40 and a receiving set 41. The output circuit of the receiver 41 is connected to three selective filters 42, 43 and 44. The filter 42 is designed to pass the wave $f_1$ of the signal frequency which is derived by the demodulation of the directional high-frequency modulated carrier. This signal wave, after passing the filter 42, is applied to the synchroscope 45. The filter 43 selectively passes the low-frequency carrier wave $f_2$ and the side-band frequencies resulting from the modulation of this wave with the signal wave $f_1$. Similarly, the filter 44 selectively passes the other low-frequency carrier wave $f_3$ and its side-band frequencies. The output circuits of these filters are connected to demodulators 46 and 47, which in turn are connected through a coupling transformer 48 wound in such manner that the two components of the signal frequency $f_1$ derived from the demodulation of the two low-frequency modulated carrier waves are brought into phase synchronism with each other and then applied to the synchroscope 45 for phase comparison with the signal wave $f_1$ of the directional field.

A further modification of the system, illustrated in Figs. 5 and 6, provides for the use of three low-frequency carrier waves for producing the non-directional field. These low-frequency carriers are of different frequencies and are modulated with the same signal wave but with phase displacements of 120 degrees. In this case any unwanted demodulation of the low-frequency carriers in the first stage of demodulation at the receiving set produces signal waves which are displaced in phase by 120 degrees. The result is that these signal waves neutralize each other and do not interfere with the signal wave obtained in the same demodulation process from the directive field. In Fig. 5 only the central antenna 50 is shown. The high-frequency carrier wave $f$ is produced by a generator 51 and applied to the modulator 52. The low-frequency carrier waves $f_4$, $f_5$ and $f_6$, each of a different frequency, are generated by oscillators 53, 54 and 55 and are applied to the respective modulators 56, 57 and 58. The waves $f_1$ of the signal frequency are generated by generator 59 with progressive phase displacements of 120 degrees. The three modulated low-frequency carrier waves are applied to the modulator 52 and serve to modulate the high-frequency wave $f$. The products of modulation produced by the modulator 52 are amplified, if necessary, by the amplifier 62 and applied to the antenna 50 for transmission.

The receiving station shown in Fig. 6, which is designed to cooperate with the sending station of Fig. 5, includes antenna 63 and a receiving set 64. The output circuit of the receiving set 64 is connected to four selective filters 65, 66, 67 and 68. The filter 65 is designed to selectively pass the signal wave $f_1$ and to deliver it to the winding 69 of any suitable instrument such as a synchroscope. The filters 66, 67 and 68 are designed to selectively pass the three low-frequency carriers $f_4$, $f_5$ and $f_6$, respectively, and their sidebands. These filters are connected to the demodulators 70, 71 and 72, which are connected as shown to the windings 73, 74 and 75 of the synchroscope. The demodulators 70, 71 and 72 demodulate the respective low-frequency carrier waves and deliver the resulting signal waves to the windings 73, 74 and 75. Since the signal waves $f_1$ employed for producing the non-directional field at the transmitting beacon bear a definite phase relation to the signal wave $f_1$ used for producing the directional field, the phase relation between the signaling frequency current in the windings 73, 74 and 75 in comparison with the signaling frequency current in the winding 69 of the synchroscope determines the azimuth or angular position of the receiving station in the field.

It will be understood, of course, that the transmitting stations illustrated in Figs. 3 and 5 are also equipped with the directional antennae and with the other necessary equipment illustrated in Fig. 1 for establishing the directional field.

What is claimed is:

1. In a signaling system, means for modulating a carrier wave of a given high frequency with a wave of signal frequency and radiating it to establish a directional field in space, means for modulating each of two low-frequency carrier waves with waves of said signal frequency, said last-mentioned carriers differing in frequency, means for utilizing said low-frequency modulated carriers to modulate a carrier wave of said high frequency, means for radiating said last-mentioned modulated high-frequency carrier to establish in space a non-directional field, means for receiving said modulated high-frequency carrier waves and for demodulating them to obtain the signal frequency component of the directional field and the modulated low-frequency carrier waves of the non-directional field, means for selectively separating said low-frequency modulated carriers from each other and from said signal frequency component, means for demodulating both of said low-frequency carrier waves to obtain the respective signal components, and means for utilizing all of the signal frequency components thus obtained.

2. The method of sending and receiving radio signals which comprises modulating a high-frequency carrier wave with a wave of signal frequency, modulating two low-frequency carrier waves, each of a different frequency, with waves of said signal frequency, utilizing the modulated low-frequency carrier waves to modulate a carrier wave of said high frequency, radiating the high-frequency modulated carrier waves, receiving the radiated waves and demodulating them to obtain a component of the signal frequency and said low-frequency modulated carrier waves, separating said low-frequency carrier waves from each other and from said component of signal frequency, demodulating both of said low-frequency carrier waves to obtain the respective components of signal frequency, and comparing all of the signal frequency components thus obtained.

3. The method of radio signaling which comprises modulating a high-frequency carrier wave with a wave of signal frequency, modulating each of two low-frequency carrier waves, each of a different frequency, with waves of said signal frequency to obtain thereby an envelope having a frequency differing from that of the signal wave, utilizing said modulated low-frequency carrier waves to modulate a carrier wave of said high frequency, radiating said modulated high-frequency carrier waves, receiving and demodulating the radiated waves to obtain three separate components of said signal frequency, and comparing the phases of said signal frequency components.

4. In a signaling system, means for modulating a carrier wave of a given high frequency with a wave of signal frequency, means for modulating three different low-frequency carrier waves, each of a different frequency, with waves of said signal frequency, said signal frequency waves being equally spaced in phase, means for utilizing the modulated low-frequency carrier waves to modulate a carrier wave of said high frequency, means for transmitting said modulated high-frequency carrier waves, means for receiving the transmitted waves and for demodulating them to obtain a component of said signal frequency and three other components each comprising one of said modulated low-frequency carrier waves, selective means for separating all four of said components from each other, means for demodulating all of said low-frequency carrier waves to obtain therefrom the respective signal frequency waves, and means for utilizing all of the signal frequency components thus obtained.

ETHEL MARGARET GREIG,
*Executrix of the Estate of John W. Greig, Deceased.*